United States Patent
Saito et al.

(10) Patent No.: US 7,627,748 B2
(45) Date of Patent: Dec. 1, 2009

(54) NETWORK CONNECTION DEVICE, NETWORK CONNECTION METHOD, AND COMMUNICATION DEVICE REALIZING CONTENTS PROTECTION PROCEDURE OVER NETWORKS

(75) Inventors: Takeshi Saito, Tokyo (JP); Yoshiaki Takabatake, Kanagawa (JP); Mikio Hashimoto, Chiba (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 712 days.

(21) Appl. No.: 10/960,701

(22) Filed: Oct. 8, 2004

(65) Prior Publication Data

US 2005/0060547 A1 Mar. 17, 2005

Related U.S. Application Data

(63) Continuation of application No. 09/697,496, filed on Oct. 27, 2000, now abandoned.

(30) Foreign Application Priority Data

Oct. 29, 1999 (JP) ................................. 11-310295

(51) Int. Cl.
*H04L 9/00* (2006.01)
(52) U.S. Cl. ..................................... 713/153
(58) Field of Classification Search ................. 713/153, 713/168, 169, 171, 172, 151, 170, 189; 709/228, 709/229
See application file for complete search history.

(56) References Cited

U.S. PATENT DOCUMENTS

| 5,949,877 | A | | 9/1999 | Traw et al. |
| 6,115,392 | A | | 9/2000 | Nomura |
| 6,154,206 | A | * | 11/2000 | Ludtke ........................ 713/168 |
| 6,202,103 | B1 | * | 3/2001 | Vonbank et al. ............... 710/15 |
| 6,389,496 | B1 | | 5/2002 | Matsuda |
| 6,519,671 | B1 | | 2/2003 | Kondou et al. |
| 6,792,532 | B1 | * | 9/2004 | Lee et al. ..................... 713/171 |
| 6,816,967 | B1 | * | 11/2004 | Iijima et al. ................. 713/164 |
| 2001/0047475 | A1 | * | 11/2001 | Terasaki ..................... 713/160 |
| 2002/0091935 | A1 | * | 7/2002 | Smith et al. ................. 713/189 |
| 2005/0195975 | A1 | * | 9/2005 | Kawakita ..................... 380/30 |

OTHER PUBLICATIONS

Intel. Corp., Platform Solutions on-line news for the hardware developer, Mar. 1998, Intel Coporation, Issue 7.

* cited by examiner

*Primary Examiner*—Beemnet W Dada
(74) *Attorney, Agent, or Firm*—Oblon, Spivak, McClelland, Maier & Neustadt, L.L.P.

(57) ABSTRACT

A scheme for realizing a contents protection procedure between devices that are not connected to the same network, in a system where the IEEE 1394 buses are connected together through a 1394 bridge or a system where the IEEE 1394 buses are connected together through another radio network, is disclosed. A network connection device notifies information regarding a transmission node on the first IEEE 1394 bus to a reception node on the second IEEE 1394 bus, so that the reception node can carry out the authentication and key exchange procedure directly with the transmission node on a different network.

18 Claims, 15 Drawing Sheets

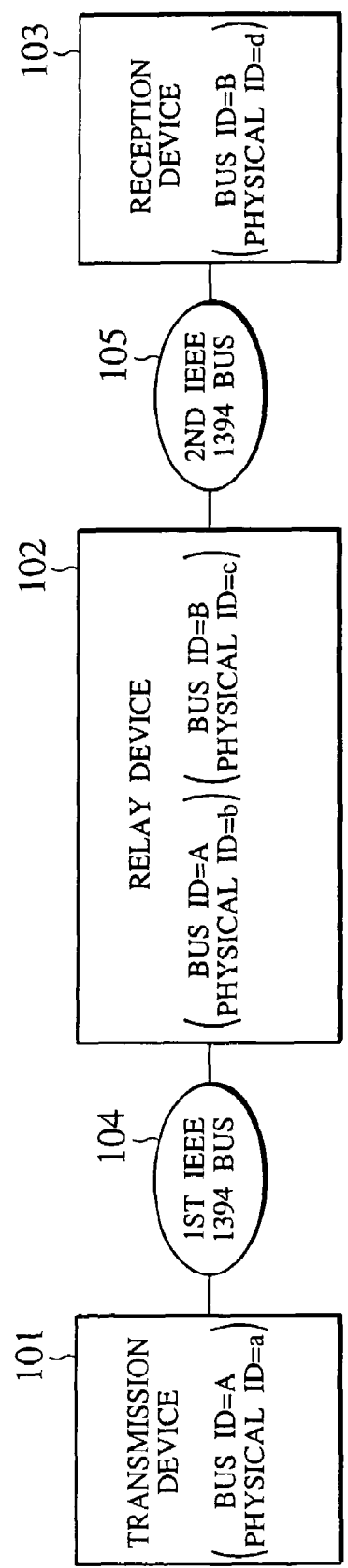

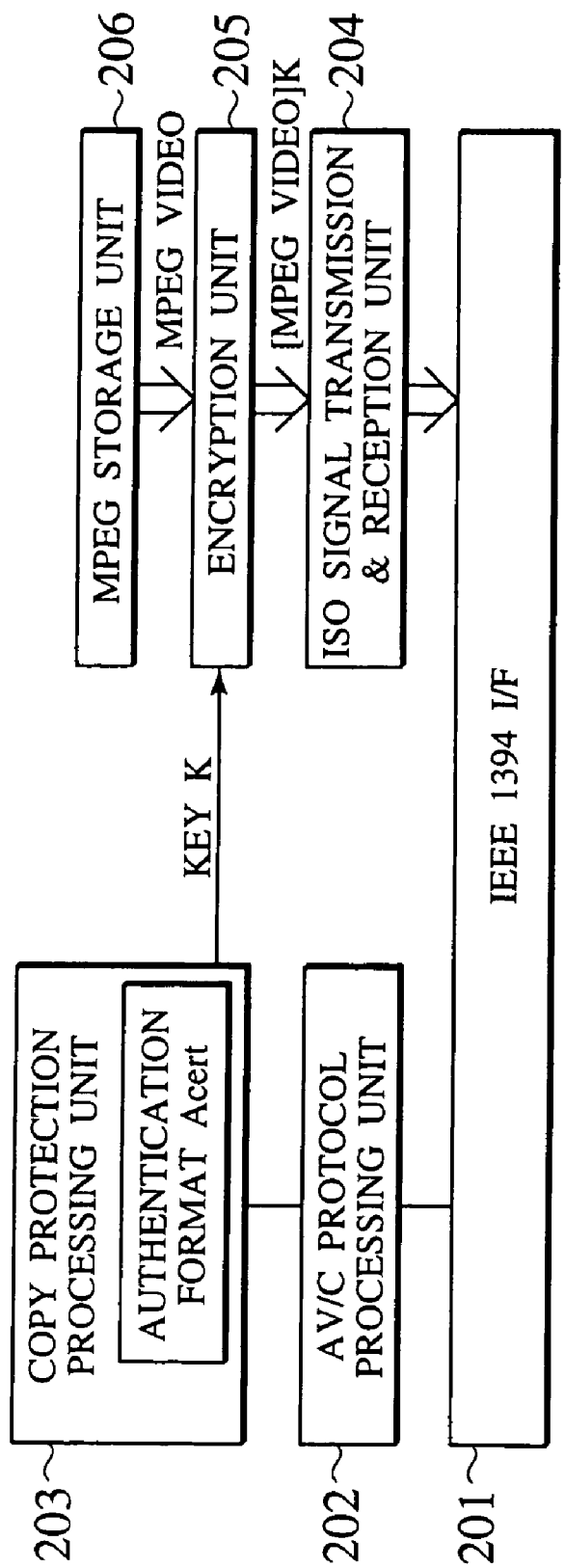

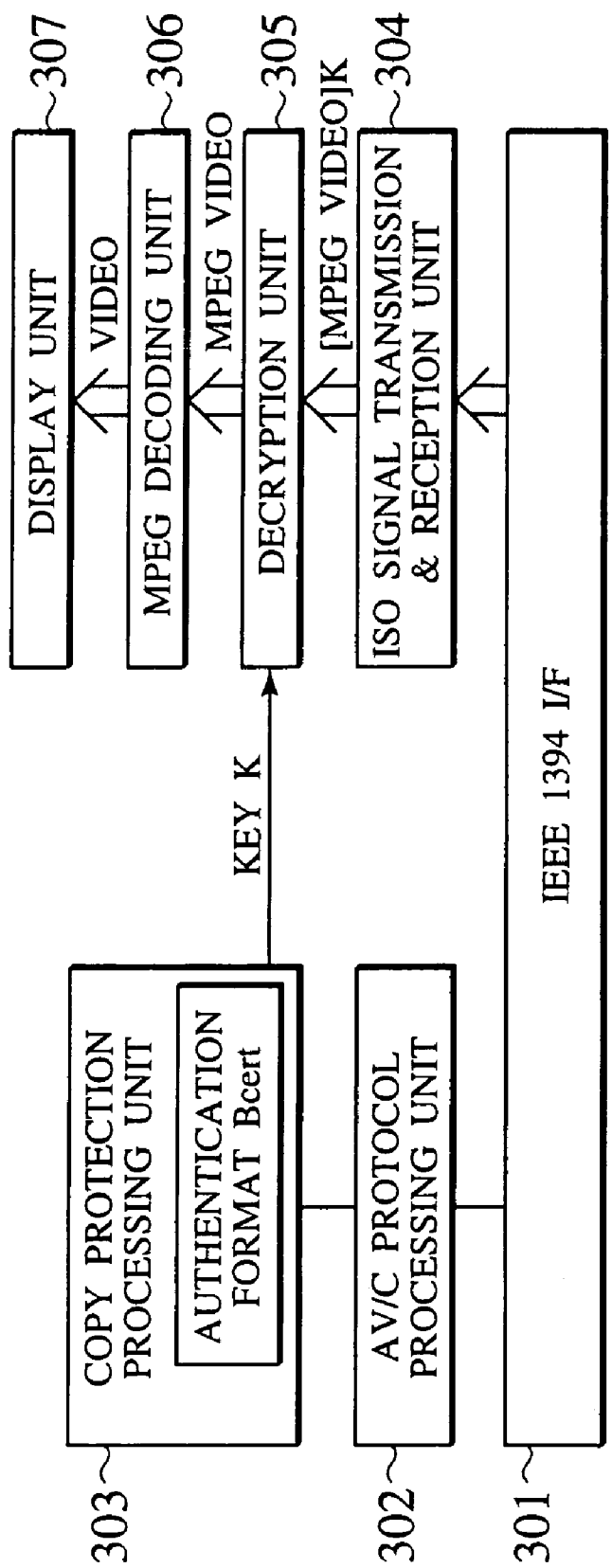

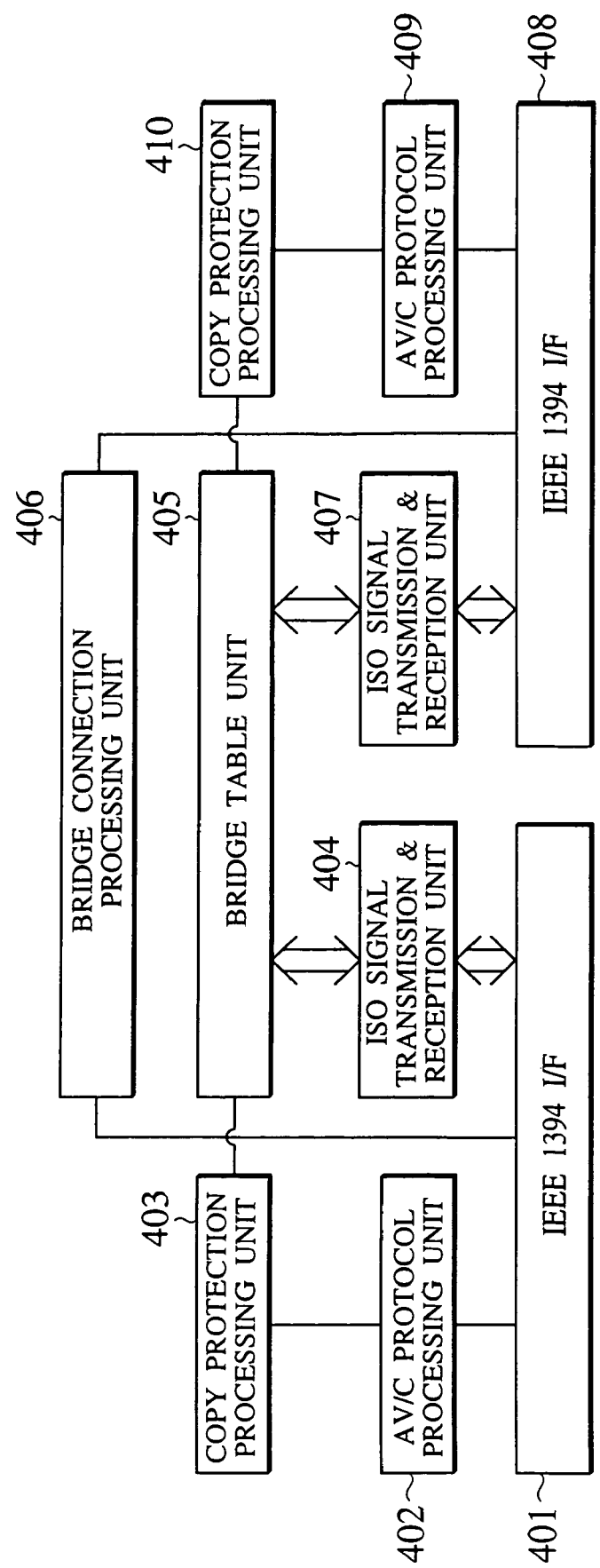

FIG.5A

| 1ST IEEE 1394 SIDE | | 2ND IEEE 1394 SIDE |
|---|---|---|
| #x | ISOCHRONOUS CHANNEL NUMBER | #y |
| TRANSMITTING SIDE | TRANSMISSION/ RECEPTION DIRECTION | RECEIVING SIDE |
| | SENDER | |
| | AUTHENTICATION TARGET | |

FIG.5B

| 1ST IEEE 1394 SIDE | | 2ND IEEE 1394 SIDE |
|---|---|---|
| #x | ISOCHRONOUS CHANNEL NUMBER | #y |
| TRANSMITTING SIDE | TRANSMISSION/ RECEPTION DIRECTION | RECEIVING SIDE |
| (A,a) | SENDER | THIS DEVICE |
| | AUTHENTICATION TARGET | |

FIG.5C

| 1ST IEEE 1394 SIDE | | 2ND IEEE 1394 SIDE |
|---|---|---|
| #x | ISOCHRONOUS CHANNEL NUMBER | #y |
| TRANSMITTING SIDE | TRANSMISSION/ RECEPTION DIRECTION | RECEIVING SIDE |
| (A,a) | SENDER | THIS DEVICE |
| | AUTHENTICATION TARGET | (B,d),iPCR[0] |

FIG.5D

| 1ST IEEE 1394 SIDE | | 2ND IEEE 1394 SIDE |
|---|---|---|
| #x | ISOCHRONOUS CHANNEL NUMBER | #y |
| TRANSMITTING SIDE | TRANSMISSION/ RECEPTION DIRECTION | RECEIVING SIDE |
| (A,a) | SENDER | THIS DEVICE |
| (A,a),oPCR[0] | AUTHENTICATION TARGET | (B,d),iPCR[0] |

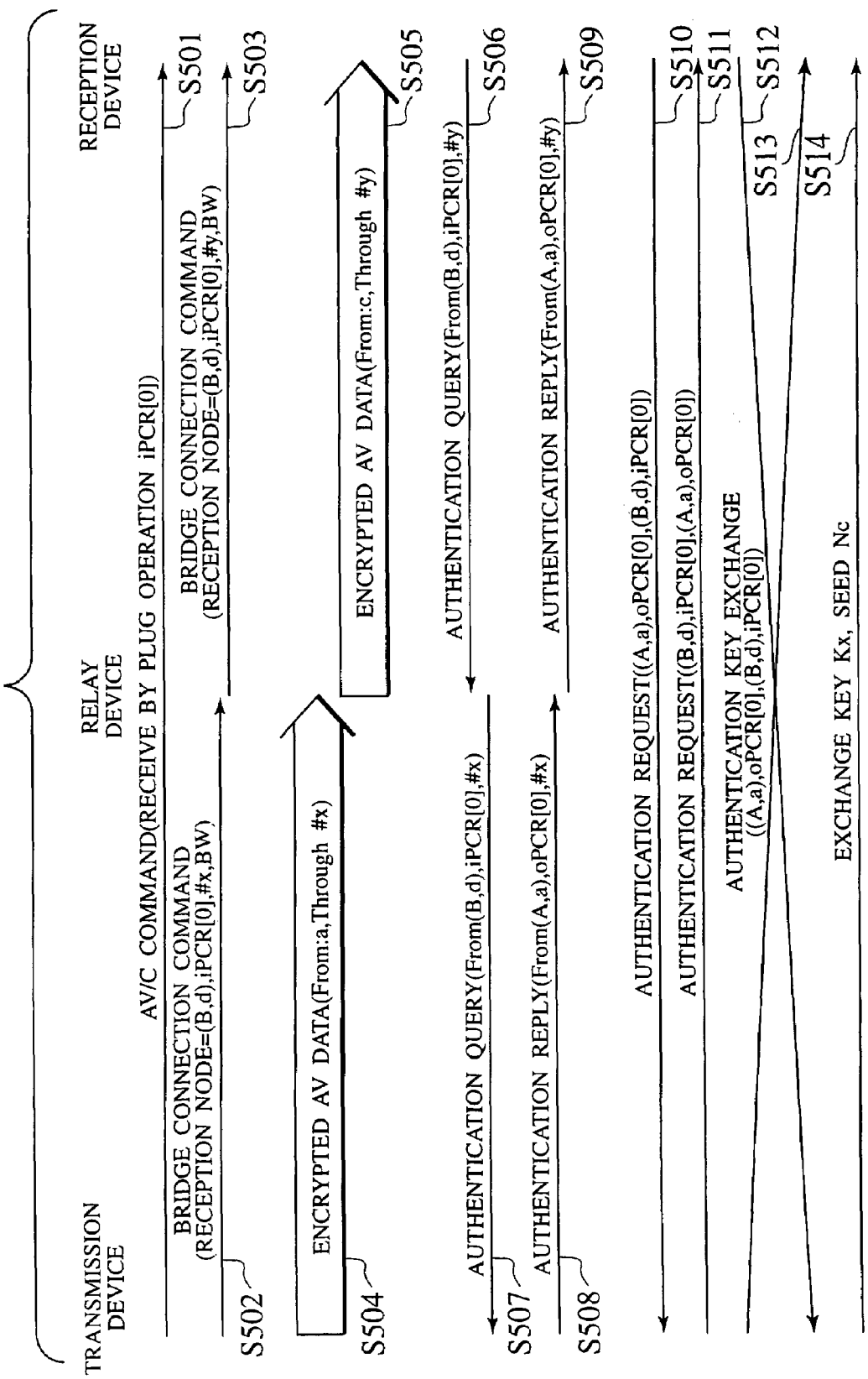

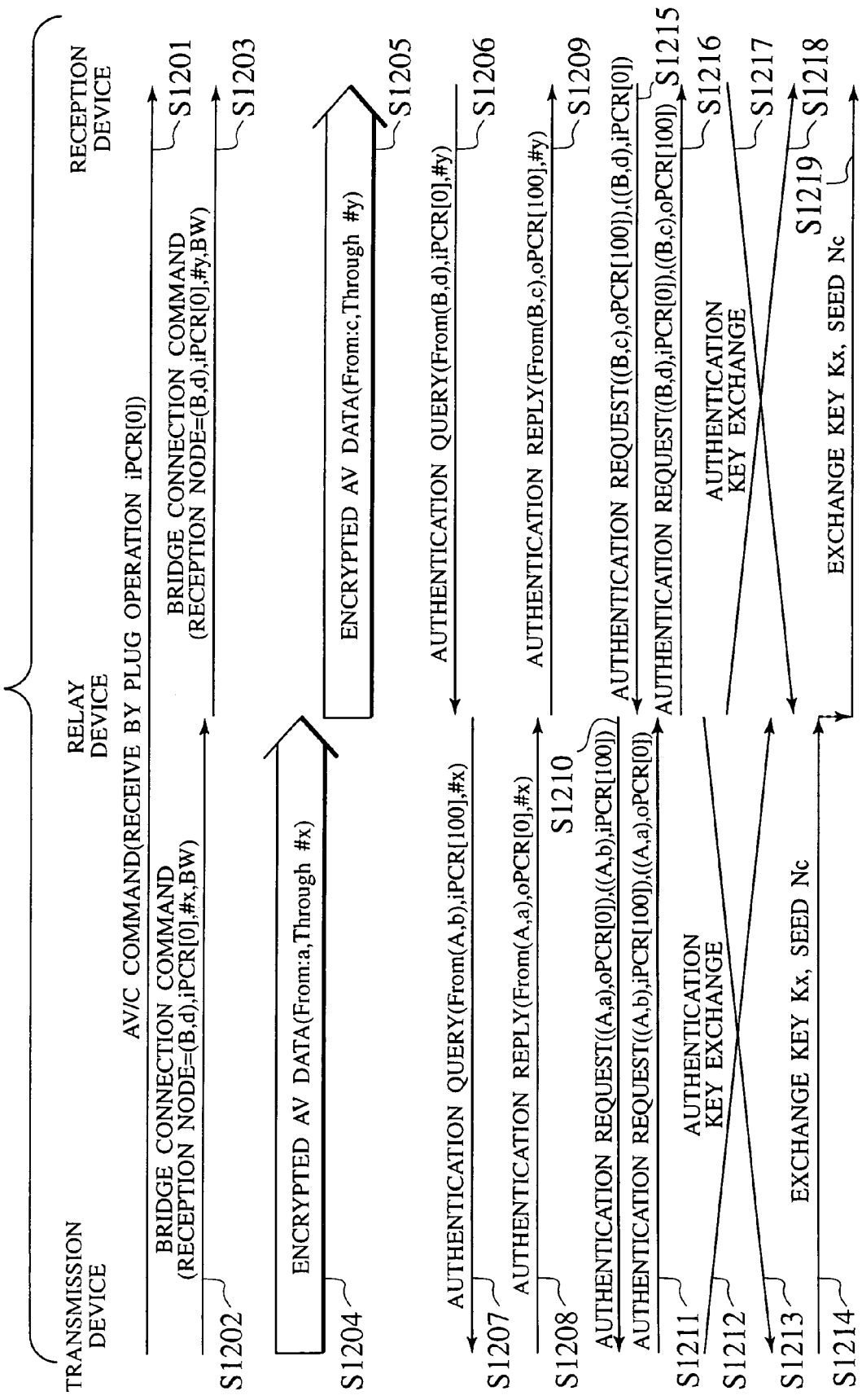

FIG.10A

| 1ST IEEE 1394 SIDE | | 2ND IEEE 1394 SIDE |
|---|---|---|
| #x | ISOCHRONOUS CHANNEL NUMBER | #y |
| TRANSMITTING SIDE | TRANSMISSION/ RECEPTION DIRECTION | RECEIVING SIDE |
| | SENDER | |
| | VIRTUAL PLUG OF THIS DEVICE | |
| | AUTHENTICATION TARGET | |

FIG.10B

| 1ST IEEE 1394 SIDE | | 2ND IEEE 1394 SIDE |
|---|---|---|
| #x | ISOCHRONOUS CHANNEL NUMBER | #y |
| TRANSMITTING SIDE | TRANSMISSION/ RECEPTION DIRECTION | RECEIVING SIDE |
| (A,a) | SENDER | THIS DEVICE |
| | VIRTUAL PLUG OF THIS DEVICE | |
| | AUTHENTICATION TARGET | |

FIG.10C

| 1ST IEEE 1394 SIDE | | 2ND IEEE 1394 SIDE |
|---|---|---|
| #x | ISOCHRONOUS CHANNEL NUMBER | #y |
| TRANSMITTING SIDE | TRANSMISSION/ RECEPTION DIRECTION | RECEIVING SIDE |
| (A,a) | SENDER | THIS DEVICE |
| iPCR[100] | VIRTUAL PLUG OF THIS DEVICE | |
| | AUTHENTICATION TARGET | (B,d),iPCR[0] |

FIG.10D

| 1ST IEEE 1394 SIDE | | 2ND IEEE 1394 SIDE |
|---|---|---|
| #x | ISOCHRONOUS CHANNEL NUMBER | #y |
| TRANSMITTING SIDE | TRANSMISSION/ RECEPTION DIRECTION | RECEIVING SIDE |
| (A,a) | SENDER | THIS DEVICE |
| iPCR[100] | VIRTUAL PLUG OF THIS DEVICE | oPCR[100] |
| (A,a),oPCR[0] | AUTHENTICATION TARGET | (B,d),iPCR[0] |

FIG.13

| 1ST IEEE 1394 SIDE | | RADIO LAN SIDE |
|---|---|---|
| #x | ISOCHRONOUS CHANNEL NUMBER | #y |
| TRANSMITTING SIDE | TRANSMISSION/ DIRECTION DIRECTION | RECEIVING SIDE |
| TRANSMISSION DEVICE | SENDER | oPCR[0] OF THIS DEVICE |
| TRANSMISSION DEVICE | AUTHENTICATION TARGET | iPCR[0] OF 2ND RELAY DEVICE |
| THIS DEVICE | RECEIVER | iPCR[0] OF 2ND RELAY DEVICE |

FIG.14

| RADIO LAN SIDE | | 2ND IEEE 1394 SIDE |
|---|---|---|
| #y | ISOCHRONOUS CHANNEL NUMBER | #z |
| TRANSMITTING SIDE | TRANSMISSION/ RECEPTION DIRECTION | RECEIVING SIDE |
| 1ST RELAY DEVICE | SENDER | THIS DEVICE |
| oPCR[0] OF 1ST RELAY DEVICE | AUTHENTICATION TARGET | RECEPTION DEVICE |
| iPCR[0] OF THIS DEVICE | RECEIVER | RECEPTION DEVICE |

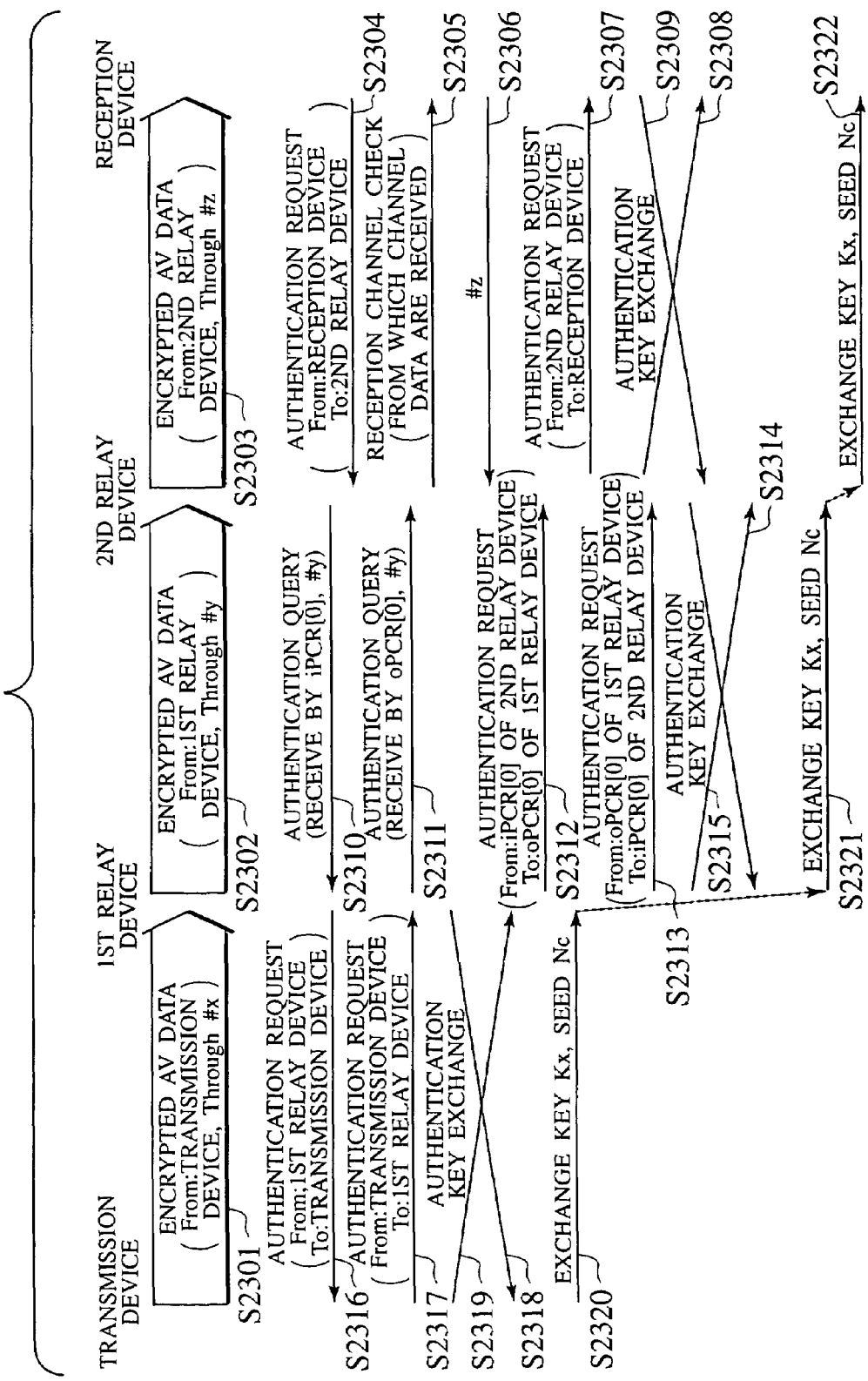

NETWORK CONNECTION DEVICE, NETWORK CONNECTION METHOD, AND COMMUNICATION DEVICE REALIZING CONTENTS PROTECTION PROCEDURE OVER NETWORKS

CROSS-REFERENCE TO RELATED APPLICATIONS

This application is a continuation of U.S. patent application Ser. No. 09/697,496, filed Oct. 27, 2000, now abandoned, which claims priority to Japan Patent 11-310295, filed Oct. 29, 1999, the entire contents of each of which are hereby incorporated herein by reference.

BACKGROUND OF THE INVENTION

1. Field of the Invention

The present invention relates to a network connection device and a network connection method for relaying data transfer between networks such as IEEE 1394 buses and radio networks, and a communication device for carrying out communications through a network such as IEEE 1394 bus and radio network.

2. Description of the Background Art

In recent years, the so called "digitalization of home AV environment" is attracting much attentions as exemplified by the beginning of the digital broadcasting and the sales of digital AV instruments. Digital AV data have some excellent characteristics including the fact that various compression schemes are applicable, the fact that they can be processed as multimedia data, the fact that they are not degraded no matter how many times they are playbacked, etc., so that they are expected to have even wider use in future.

However, this digital AV technique has another aspect that "an illegal copy of contents can be made easily". Namely, for any digital contents, it is in principle possible to produce a copy with the same quality as the original, that will not degrade at all forever, by making "bit copy" so that the so called "illegal copy" problem arises.

Some techniques for preventing this "illegal copy" are currently discussed, including "1394CP Content Protection system Specification" that is discussed by the CPTWG (Copy Protection Technique Working Group). In this technique, for contents (such as MPEG data for example) to be transferred between nodes connected to the IEEE 1394 bus, the authentication between the transmitting and receiving nodes is carried out in advance so as to enable the sharing of an encryption key (contents key), and the contents are subsequently transferred by encrypting the contents such that the contents cannot be read by anyone except for those who have carried out the authentication procedure.

In this way, a node that has not carried out the authentication procedure cannot ascertain the value of the contents key so that even if the transferred data (encrypted data) are obtained by such a node, the encrypted data cannot be decrypted by such a node. By making a rule that nodes that can participate in the authentication are only those nodes that are permitted by a prescribed authentication authority, it is possible to prevent an illegal node from acquiring the encryption key so that it is possible to prevent the illegal copy.

The IEEE 1394 bus is a network system having some very excellent characteristics including the fact that its speed is 100 Mbps at least, the fact that the network itself is equipped with an automatic configuration recognition function, the fact that it has a QOS transfer function, etc., so that it has been established as the de facto standard of a network for home digital AV use.

However, because of these characteristics, the IEEE 1394 also give rise to various constraints in the case of "connecting the IEEE 1394 with other networks". For example, in the case of connecting the IEEE 1394 bus with a radio network or a public network, it is impossible to directly extend the IEEE 1394 protocol to the radio network or the public network, because these networks are not as fast as over 100 Mbps in general and the automatic configuration recognition function of the IEEE 1394 cannot be directly extended to these networks so easily.

For this reason, there are some propositions including a method in which a protocol conversion gateway is provided between the IEEE 1394 and the other network such as radio network or public network so as to interconnect them, and a method using the so called proxy server for providing services on one network as services on the other network.

But, in the case of attempting to apply these methods to the 1394 copy protection described above, currently the copy protection technique is defined only for the IEEE 1394 bus and currently there is no technique for extending this copy protection technique to the case of "connecting the IEEE 1394 with the other network".

Also, in the case of connecting the IEEE 1394 buses together, the following problems have been encountered.

In the case where a transmitting node connected to the IEEE 1394 bus transmits encrypted data, it will transmits a packet that contains at least the encrypted data, a source node ID, and a transmission channel.

In the case of transmitting this data to a receiving node connected to another IEEE 1394 bus that is connected with the transmitting side IEEE 1394 bus through a network connection device, the following two cases can be considered. In the first case, the network connection device rewrites the source of this packet to a node ID of the own device. In this case, there has been a problem that the transmitting node and the receiving node cannot carry out the authentication and key exchange directly. On the other hand, in the second case, the network connection device transfers data without rewriting the source node ID. In this case, there has been a problem that an overlap in the node ID occurs because the transmitting node and the receiving node are on different IEEE 1394 buses so that data cannot be transferred accurately.

Thus the conventional copy protection techniques are insufficient for an extension to a system in which the IEEE 1394 buses are connected together through a 1394 bridge.

SUMMARY OF THE INVENTION

It is therefore an object of the present invention to provide a network connection device, a network connection method and a communication device capable of carrying out a contents protection procedure between devices that are not connected to the same network, in a system where the IEEE 1394 buses are connected together through a 1394 bridge or a system where the IEEE 1394 buses are connected together through another radio network.

It is another object of the present invention to provide a network connection device, a network connection method and a communication device capable of extending the copy protection technique to not Just the IEEE 1394 but also the other network that is interconnected with the IEEE 1394.

According to one aspect of the present invention there is provided a network connection device for connecting a first IEEE 1394 bus and a second IEEE 1394 bus, comprising: a data reception unit configured to receive data transferred from a transmission node connected to the first IEEE 1394 bus through a first isochronous channel on the first IEEE 1394 bus; a data transfer unit configured to transfer the data to a reception node connected to the second IEEE 1394 bus through a second isochronous channel on the second IEEE 1394 bus; a query reception unit configured to receive a query on information regarding the transmission node from the reception node, by using a prescribed packet on the second IEEE 1394 bus; an inquiry unit configured to make an inquiry on the information regarding the transmission node to the transmission node, by using a prescribed packet on the first IEEE 1394 bus, upon receiving the query; a reply reception unit configured to receive a reply to the inquiry from the transmission node, by using a prescribed packet on the first IEEE 1394 bus; and a reply notification unit configured to notify the reply to the reception node, by using a prescribed packet on the second IEEE 1394 bus, upon receiving the reply.

According to another aspect of the present invention there is provided a network connection device for connecting a first network and a second network, the first network supporting a use of one or more encryption keys for transmission and/or reception of encrypted data between nodes connected to a same network, and the second network supporting a use of an identical encryption key and a use of transmission and/or reception through a prescribed channel for transmission and/or reception of encrypted data between nodes connected to a same network, the network connection device comprising: a data reception unit configured to receive data transferred from a node connected on the first network; a data transfer unit configured to transfer the data received by the data reception unit to a node connected on the second network through the prescribed channel on the second network; an authentication request reception unit configured to receive an authentication request from one node connected on the second network; an encryption key information reception unit configured to receive an encryption key information regarding an encryption key for a specific data to be transferred to the specific channel on the second network from another node connected on the first network which is transmitting the specific data to the network connection device; and an encryption key information transfer unit configured to transfer the encryption key information to said one node.

According to another aspect of the present invention there is provided a communication device, connected to a first IEEE 1394 bus, for receiving data through a network connection device connected to the first IEEE 1394 bus from a transmission node on a second IEEE 1394 bus, the communication device comprising: a data reception unit configured to receive data transferred from the network connection device, through a first isochronous channel on the first IEEE 1394 bus; a query unit configured to make a query on information regarding the transmission node to the network connection device by using a prescribed packet on the first IEEE 1394 bus, when the data received by the data reception unit are encrypted; a reply reception unit configured to receive a reply to the query from the network connection device by using a prescribed packet on the first IEEE 1394 bus, the reply being obtained by the network connection device by making an inquiry on the information regarding the transmission node on the second IEEE 1394 bus upon receiving the query; and an authentication and key exchange processing unit configured to carry out an authentication and key exchange procedure directly with the transmission node on the second IEEE 1394 bus, according to the reply received by the reply reception unit.

According to another aspect of the present invention there is provided a network connection method for connecting a first IEEE 1394 bus and a second IEEE 1394 bus, comprising the steps of: (a) transmitting data through a first isochronous channel from a transmission node on the first IEEE 1394 bus; (b) receiving the data transmitted from the transmission node through the first isochronous channel on the first IEEE 1394 bus at a network connection device, and transferring the data from the network connection device to a reception device on the second IEEE 1394 bus through a second isochronous channel on the second IEEE 1394 bus; (c) receiving the data transferred from the network connection device through the second isochronous channel on the second IEEE 1394 bus at the reception node, and when the data are encrypted, making a query on information regarding the transmission node from the reception node to the network connection device by using a prescribed packet on the second IEEE 1394 bus; (d) making an inquiry on the information regarding the transmission node from the network connection device to the transmission node by using a prescribed packet on the first IEEE 1394 bus, upon receiving the query from the reception node; (e) transmitting a reply to the inquiry from the transmission node to the network connection device by using a prescribed packet on the first IEEE 1394 bus, upon receiving the inquiry from the network connection device; and (f) notifying the reply from the network connection device to the reception device by using a prescribed packet on the second IEEE 1394 bus, upon receiving the reply from the transmission node.

Other features and advantages of the present invention will become apparent from the following description taken in conjunction with the accompanying drawings.

BRIEF DESCRIPTION OF THE DRAWINGS

FIG. 1 is a schematic diagram showing an exemplary overall configuration of a network according to the first and second embodiments of the present invention.

FIG. 2 is a block diagram showing an exemplary internal configuration of a transmission device according to the first, second and third embodiments of the present invention.

FIG. 3 is a block diagram showing an exemplary internal configuration of a reception device according to the first, second and third embodiments of the present invention.

FIG. 4 is a block diagram showing an exemplary internal configuration of a relay device according to the first embodiment of the present invention.

FIGS. 5A, 5B, 5C and 5D are diagrams showing examples of a bridge table according to the first embodiment of the present invention.

FIG. 6 is a sequence chart for an exemplary overall operation sequence according to the first embodiment of the present invention.

FIG. 9 is a sequence chart for an exemplary overall operation sequence according to the second embodiment of the present invention.

FIGS. 10A, 10B, 10C and 10D are diagrams showing examples of a bridge table according to the second embodiments of the present invention.

FIG. 13 is a diagram showing an example of a channel correspondence table in a first relay device according to the third embodiment of the present invention.

FIG. 14 is a diagram showing an example of a channel correspondence table in a second relay device according to the third embodiment of the present invention.

FIG. 15 is a sequence chart for an exemplary overall operation sequence according to the third embodiment of the present invention.

DETAILED DESCRIPTION OF THE PREFERRED EMBODIMENTS

First Embodiment

Figure 7:
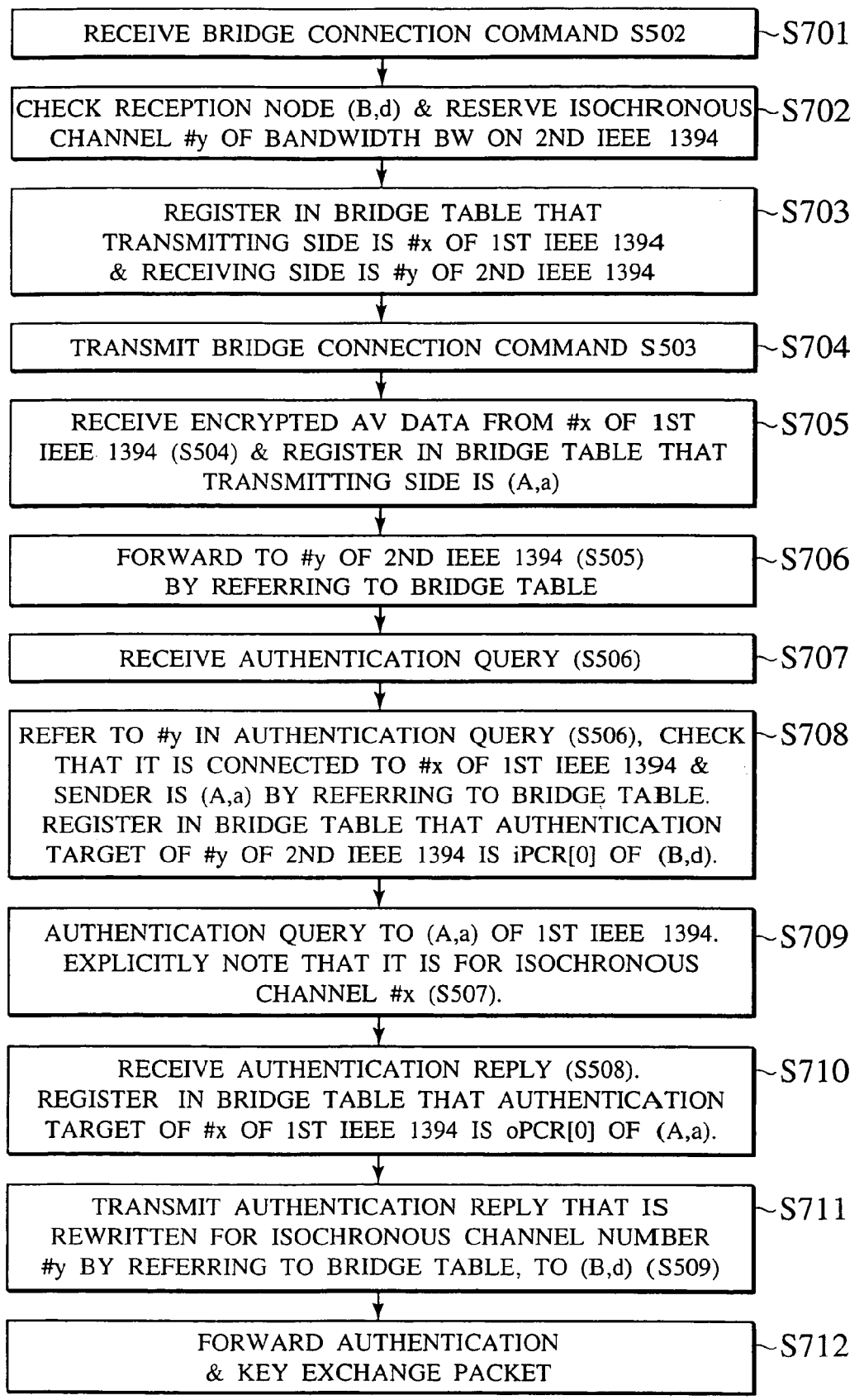
FIG. 7 is a flow chart for an exemplary operation procedure of a relay device according to the first embodiment.

Referring now to FIG. 1 to FIG. 7, the first embodiment of a network connection device, a network connection method and a communication device according to the present invention will be described in detail.

FIG. 1 shows an exemplary overall configuration of a network to which the present invention is to be applied.

This embodiment will be described for an exemplary case where, in a network as shown in FIG. 1 in which two IEEE 1394 buses 104 and 105 are connected by a bridge connection provided by a relay device (or a network relay device) 102, an AV stream is to be transferred from a transmission device 101 connected to the first IEEE 1394 bus 104 through the relay device 102 to a reception device 103 connected to the second IEEE 1394 bus 105. In this exemplary case, the AV stream to be transferred between the transmission device 101 and the reception device 103 are assumed to be encrypted for the purpose of copyright protection (illegal copy prevention). Also, the case of using MPEG video data as an example of the AV stream will be described.

In this embodiment, it is assumed that the authentication and key exchange on the IEEE 1394 bus is carried out for each AV data flow or for each AV/C plug, and different encryption keys K can be used for different flows or different plugs between the same nodes. Here, PCRs (Plug Control Registers) such as iPCR (input Plug Control Register) and oPCR (output Plug Control Register) denote logical numbers defined in the IEEE 1394 AV/C specification, which can be regarded as an input number or an output number for inputting or outputting the AV stream data to be inputted or outputted from a network interface (an IEEE 1394 I/F in this embodiment). Note that the specific PCR numbers used in the following description are only examples.

The first IEEE 1394 bus 104 has a bus ID of "A", and the second IEEE 1394 bus 105 has a bus ID of "B". The transmission device 101 has a physical ID of "a", and the reception device 103 has a physical ID of "d". A node ID (address) of a node is defined in a form of (bus ID, physical ID). The transmission device 101 has a node ID of (A, a), and the reception device 103 has a node ID of (B, d). The relay device 102 has an interface on the first IEEE 1394 bus 104 side with a node ID of (A, b), and an interface on the second IEEE 1394 bus 105 side with a node ID of (B, c).

Note that, in this embodiment, a node that is a transmitting side in this example will be referred to as a transmission device and a node that is a receiving side in this example will be referred to as a reception device, but as should be apparent, the transmission device 101 and the reception device 103 may have functions other than that of the transmitting side and that of the receiving side as will be described below (or may have both the function of the transmitting side and the function of the receiving side). Also, in FIG. 1, only three nodes 101, 102 and 103 are shown, but nodes other than these may also be connected in addition. These remarks equally apply to the other embodiments described below.

FIG. 2 shows an exemplary internal configuration of the transmission device 101.

As shown in FIG. 2, this transmission device 101 comprises an IEEE 1394 interface (I/F) 201, an AV/C protocol processing unit 202 for carrying out AV/C (AV/C Digital Interface Command Set General Specification) protocol processing, a copy protection processing unit 203 for carrying out processing regarding the copy protection within the AV/C protocol, an ISO signal transmission and reception unit 204 for transmitting and receiving data to be exchanged through isochronous channels among data transmitted and received through the IEEE 1394, an MPEG storage unit 206 for storing MPEG video data, and an encryption unit 205 for encrypting the MPEG video data by using an encryption key K given from the copy protection processing unit 203, and sending the encrypted MPEG video data to the ISO signal transmission and reception unit 204.

The transmission device 101 is a node capable of storing the MPEG video data therein, which transmits the MPEG video data in response to a request. The transmission device 101 has a function for encrypting the MPEG video data to be transmitted according to the need at a time of transmission, in order to prevent the illegal copying on the transfer route. For this purpose, the transmission device 101 also has a mechanism for carrying out exchange of authentication data, encryption key, etc., with a receiving node of the MPEG video data that is transmitted from the own device.

In this example, the transmission device 101 carries out the authentication and key exchange procedure directly with respect to the relay device 102 and indirectly with respect to the reception device 103 in order to realize an exchange of the AV stream with the reception device 103 after the encryption. For this purpose, the copy protection processing unit 203 has an authentication format (device certificate) Acert therein and carries out the authentication and key exchange procedure.

In the case of the IEEE 1394, the authentication and key exchange procedure is included in the AV/C protocol, so that a multiplexing processing is carried out at the AV/C protocol processing unit 202, and packets are exchanged through the IEEE 1394 interface 201. The encryption key K to be used is determined at the copy protection processing unit 203.

Here, the AV stream to be transmitted from the transmission device 101 is assumed to be an MPEG stream. The MPEG stream transmitted from the MPEG storage unit 206 is encrypted by using the encryption key K at the encryption unit 205, applied with a timestamping processing and a packet formatting suitable for the IEEE 1394 at the ISO signal transmission and reception unit 204, and transmitted to the first IEEE 1394 bus 104 through the IEEE 1394 interface 201.

Next, FIG. 3 shows an exemplary internal configuration of the reception device 103.

As shown in FIG. 3, this reception device 103 comprises an IEEE 1394 interface (I/F) 301, an AV/C protocol processing unit 302 for carrying out the AV/C protocol processing, a copy protection processing unit 303 for carrying out processing regarding the copy protection within the AV/C protocol, an ISO signal transmission and reception unit 304 for transmitting and receiving data to be exchanged through isochronous channels among data transmitted and received through the IEEE 1394, a decryption unit 305 for decrypting the received encrypted stream (MPEG video, etc.) by using the encryption key K given from the copy protection processing unit 303, an MPEG decoding unit 306, and a display unit 307 for displaying video.

The reception device 103 is a device having a function for decoding and displaying the receiving MPEG video data. The reception device 103 has a function for decrypting the MPEG video data transmitted by the transmitting side in an encrypted form in order to prevent the illegal copying on the transfer route. For this purpose, the reception node 103 also has a mechanism for carrying out exchange of authentication data, encryption key, etc., with a transmitting node of the MPEG video data.

In this example, the reception device 103 carries out the authentication and key exchange procedure directly with respect to the relay device 102 and indirectly with respect to the transmission device 101 in order to realize an exchange of the AV stream with the transmission device 101 after the encryption. For this purpose, the copy protection processing unit 303 has an authentication format (device certificate) Bcert therein and carries out the authentication and key exchange procedure. Here, it is assumed that the authentication format (device certificate) Bcert is issued by the same issuance organization that issued the authentication format (device certificate) Acert of the transmission device 101.

When packets are received through the IEEE 1394 interface 301, packets for the authentication and key exchange for the purpose of the copy protection are applied with a demultiplexing processing at the AV/C protocol processing unit 302 and given to the copy protection processing unit 303. By this authentication and key exchange procedure, the encryption key K used in encrypting the AV stream is determined.

When the encrypted AV stream is received through the IEEE 1394 interface 301, the encrypted AV stream is applied with a synchronization processing using a timestamp and a 1394 header removal at the ISO signal transmission and reception unit 304, and given to the decryption unit 305. This encrypted AV stream is then decrypted at the decryption unit 305 by using the encryption key K given from the copy protection processing unit 303, decoded at the MPEG decoding unit 306, and displayed and playbacked as video and audio data at the display unit 307.

Next, FIG. 4 shows an exemplary internal configuration of the relay device 102.

As shown in FIG. 4, this relay device 102 comprises a first IEEE 1394 interface (I/F) 401, a second IEEE 1394 interface (I/F) 408, a first AV/C protocol processing unit 402, a second AV/C protocol processing unit 409, a first copy protection processing unit 403, a second copy protection processing unit 410, a bridge table unit 405, a first ISO signal transmission and reception unit 404, a second ISO signal transmission and reception unit 407, and a bridge connection processing unit 406.

The first copy protection processing unit 403 carries out the authentication and key exchange procedure with a device (the transmission device 101 in this example) on the first IEEE 1394 bus 104. Similarly, the second copy protection processing unit 410 carries out the authentication and key exchange procedure with a device (the reception device 103 in this example) on the second IEEE 1394 bus 105.

In the IEEE 1394 bridge connection, it is possible to connect isochronous channels between a plurality of IEEE 1394 buses. The bridge table unit 405 stores correspondences between them.

FIGS. 5A to 5D show an exemplary configuration of a bridge table managed by the bridge table unit 405. In this example, the bridge table registers a relationship between a specific isochronous channel (#x, for example) on the first IEEE 1394 bus 104 and a specific isochronous channel (#y, for example) on the second IEEE 1394 bus 105, that is, isochronous channel numbers, information (transmission/reception direction) indicating which one is a transmitting side and which one is a receiving side, a node ID=(bus ID, physical ID) of a sender, and authentication targets for carrying out the authentication and key exchange procedure with respect to respective channels. As will be described below, these information will be registered sequentially.

Next, the overall operation sequence for the MPEG video transfer after applying the copy protection will be described with references to an exemplary overall sequence as shown in FIG. 6, and an exemplary flow chart for the relay device 102 as shown in FIG. 7.

First, the transmission device 101 issues an AV/C command with respect to the reception device 103, and carries out a plug operation for it (step S501). More specifically, an input plug control register (iPCR) of the reception device 103 is operated, and a command such as "a request that data should be received through iPCR[0]" or "a video display request with respect to a display sub-unit", for example, is issued. Note that a sub-unit is a functional element within a node that is defined by the AV/C protocol.

Next, the transmission device 101 issues a bridge connection command in order to establish an isochronous channel reaching from the own device to the reception device 103 (step S502).

This bridge connection command contains information that requests "Establish an isochronous reaching to iPCR[0] of the receiving node (B, d). Use BW as a bandwidth and #x as an isochronous channel number on the first IEEE 1394 bus.", for example. This command may be transmitted in a form of an asynchronous packet (which can be destined to the reception device 103 or the relay device 102, or their specific register), or in a form of an asynchronous stream. In either case, this command will be received by the relay device 102 once.

Note that a relay device other than the relay device 102 may be connected on the first IEEE 1394 bus 104 or may receive this command, but it is assumed that the other device on the route reaching to the reception device 103 does not carry out a processing of this command.

The bridge connection command transmitted from the transmission device 101 is received by the relay device 102 (step S701) (and given to its bridge connection processing unit 406).

Upon receiving this bridge connection command, the relay device 102 recognizes that the own device is on a route reaching to a receiving node (B, d), reserves an isochronous channel (#y) having a necessary bandwidth BW in a route (the second IEEE 1394 bus) reaching to the reception device 103, and issues a bridge connection command (steps S503, S702, S704). This bridge connection command may be an asynchronous packet destined to the reception device 103. The content of this command is almost the same as the bridge connection command at the step S502, except that the recorded isochronous channel number is rewritten to #y that is to be used on the second IEEE 1394 bus.

In conjunction with above described command (either simultaneously or consecutively), the bridge connection processing unit 406 carries out a setting of values in an "isochronous channel number" line and a "transmission/reception direction" line in the bridge table (step S703). FIG. 5A shows the registered content of the bridge table at this point.

By these bridge connection commands, a route (#x→#y) of isochronous channels between the transmission device 101 and the reception device 103 is established.

Next, the transmission device 101 transmits the AV stream that is encrypted by using the encryption key K, through the isochronous channel #x (step S504).

Note that neither the authentication request nor the authentication and key exchange is carried out yet at this point. Also, the reception device 103 has not obtained the encryption key K yet.

When the above described encrypted AV stream is received from the isochronous channel #x (step S705), the relay device 102 refers to the bridge table and judges that this AV stream should be transmitted to the second IEEE 1394 bus 105 side through the isochronous channel #y, and transmits this AV stream through the isochronous channel #y on the second IEEE 1394 bus 105 after appropriately changing a timestamp value and the like (steps S505, S706). At this point, the encrypted AV stream is transmitted as it is.

Also, in conjunction with this (either simultaneously or consecutively), the relay node 102 refers to a source node ID of the isochronous packet received from the first IEEE 1394 bus 104 and recognizes that a node ID of a sender is (A, a), and registers this ID information into a field for a sender on the first IEEE 1394 bus side in the bridge table (step S705). Also, this device itself is entered into a field for a sender on the second IEEE 1394 bus side. FIG. 5B shows the registered content of the bridge table at this point.

Next, the reception device 103 receives the above described encrypted AV stream through the isochronous channel #y. At this point, the reception device 103 recognizes that the received data is encrypted so that there is a need for the authentication and key exchange with a sender of this encrypted data. Here, in order to carry out the authentication and key exchange, there is a need to carry out a procedure for acquiring (information regarding) a sender of this encrypted data.

To this end, the reception device 103 transmits an authentication query packet to the relay device 102 in order to acquire (information regarding) a sender of the received encrypted data (step S506).

This authentication query packet is a packet for checking which node (or which plug of which node) is transmitting data with respect to the isochronous channel #y on the second IEEE 1394 bus 105. Also, this packet contains a node ID (B, d) of the reception device 103 and a value of iPCR[0] which is a receiving plug, etc., besides the isochronous channel number #y, so as to indicate that the reception device 103 is receiving this encrypted AV data.

Note that, in practice, this authentication query packet may be a packet to be transmitted by an asynchronous stream, or an asynchronous packet destined to the relay device 102 because it is possible to ascertain that the relay device 102 is transmitting the encrypted AV data through the isochronous channel #y by looking at a value of the source node ID of the encrypted AV data.

For the same reason, the authentication query at the steps S506 and S507 can be carried out by using an asynchronous stream or an asynchronous packet. Similarly, the authentication reply at the steps S508 and S509 can also be carried out by using an asynchronous stream or an asynchronous packet.

Upon receiving this authentication query packet (step S707), the relay device 102 registers that "iPCR[0] of (B, d) is receiving the isochronous channel #y" in a field for the authentication target in the bridge table (step S708). FIG. 5C shows the registered content of the bridge table at this point.

In addition, the relay device 102 checks that (A, a) on the first IEEE 1394 bus 104 is transmitting to this isochronous channel by referring to the bridge table (step S708), and forwards the authentication query to (A, a) (steps S507, S709). At this point, the isochronous channel number in the authentication query packet is changed to #x that corresponds to the isochronous channel on the first IEEE 1394 bus 104 by referring to the bridge table.

Upon receiving this authentication query packet, the transmission device 101 returns an authentication reply indicating that what is transmitting to the isochronous channel #x is a plug oPCR[0] of a node ID (A, a) (step S508). At this point, the destination of the authentication reply is set as the relay device 102 which is a sender of the authentication query at the step S507.

Upon receiving this authentication reply (step S710), the relay device 102 registers the authentication target ((A, a), oPCR[0]) on the first IEEE 1394 bus side in the bridge table by referring to this packet (step S710). FIG. 5D shows the registered content of the bridge table at this point.

In addition, the relay device 102 forwards the authentication reply to the reception device 103 after rewriting it for the isochronous channel #y used on the second IEEE 1394 bus 105 (steps S509, S711).

By the above procedure, the reception device 103 recognizes that the authentication target with which the authentication and key exchange should be carried out is the transmission device 101 (a plug oPCR[0] of a node ID (A, a)). At this point, the reception device 103 that is a receiver becomes possible to carry out the authentication and key exchange with the transmission device 101 that is a sender.

Next, the reception device 103 directly transmits the authentication request to the transmission device 101 (step S510). This authentication request may contain values of a node ID (A, a) and a plug oPCR[0] of the transmitting side device, and a node ID (B, d) and a plug iPCR[0] of the receiving side device. In addition, this authentication request may also contain the device certificate Bcert of the reception device 103.

The transmission device 101 also directly transmits the authentication request to the reception device 103 (step S511). This authentication request may contain values of node IDs and plugs of the transmitting side device and the receiving side device as well. In addition, this authentication request may also contain the device certificate Acert of the transmission device 101.

When the authentication becomes ready, the authentication and key exchange is carried out next (step S512, S513, S712), and the authentication key is shared by both the transmission device 101 and the reception device 103. Next, an exchange key Kx and a seed Nc necessary in calculating the encryption key K are transmitted from the transmission device 101 to the reception device 103 (step S514), such that the reception device 103 becomes capable of calculating the encryption key K according to the exchange key Kx and the seed Nc.

Thereafter, it is possible to carry out the cipher communications using the encryption key K between the transmission device 101 and the reception device 103 through the relay device 102.

Namely, the transmission device 101 encrypts the MPEG video to be transmitted, by using the encryption key K at the encryption unit 205, and transmits it to the relay device 102 through the isochronous channel #x on the first IEEE 1394 bus 104.

The relay device 102 transfers the encrypted MPEG video transmitted from the transmission device 101 through the isochronous channel #x to the isochronous channel #y, via the ISO signal transmission and reception units 404 and 407.

Upon receiving this, the reception device 103 decrypts the MPEG video by using the encryption key K. The decrypted MPEG data are then decoded (into MPEG codes) at the MPEG decoding unit 306, and the decoded data is displayed and playbacked at the display unit 307, for example.

In this way, even in an interconnected environment involving a bridge node between one IEEE 1394 bus and another IEEE 1394 bus, it becomes possible to carry out the authentication procedure and the key exchange procedure between the end-nodes (the transmission device, 101 and the reception device 103 in this embodiment), and moreover it is devised such that their contents cannot be ascertained by any other node including the relay device 102. Also, the actual data such as MPEG video that requires the contents protection is transferred in an encrypted form throughout the route so that a copying is impossible, and therefore a safe data transfer is possible. As a result, it becomes possible to carry out the data transfer that accounts for the copy protection even in such an interconnected environment.

Note that the authentication query packet may specify its destination in a specific address (register) in a CSR (Command Status Register) space of the IEEE 1394, and may be defined as one of AV/C security commands.

In this embodiment, an exemplary case of using the PCR number in the authentication query has been described, but it is also possible to adopt a configuration in which the authentication query is realized by using the isochronous channel number through which the AV data is transferred or the sub-unit number, instead of the PCR number.

In other words, it is possible to use a sub-unit instead of a plug in the above description. In the case of using the sub-unit, the authentication query at the steps S506 and S507, the authentication reply at the steps S508 and S509, the authentication request at the steps S510 and S511, and the authentication key exchange at the steps S512 and S513 in the sequence of FIG. 6 should be modified such that each occurrence of the input or output plug number in these steps is replaced by a destination or source sub-unit ID, respectively.

Second Embodiment

Referring now to FIG. 8 to FIGS. 10A to 10D, the second embodiment of a network connection device, a network connection method and a communication device according to the present invention will be described in detail.

This second embodiment is also directed to the authentication and key exchange, and the encrypted data exchange in the case of the bridge connection similarly as the first embodiment, but differs from the first embodiment in that the relay device also has a device certificate and the relay device terminates the authentication and key exchange on the first IEEE 1394 bus as well as the authentication and key exchange on the second IEEE 1394 bus. Note however that the encrypted data, a value of the exchange key Kx, and a value of the seed Nc will be forwarded as they are without being terminated at the relay device.

In the following, the differences from the first embodiment will be mainly described.

In this second embodiment, the exemplary network configuration is the same as that of FIG. 1, the exemplary internal configuration of the transmission device 101 is the same as that of FIG. 2, and the exemplary internal configuration of the reception device 103 is the same as that of FIG. 3.

Figure 8:
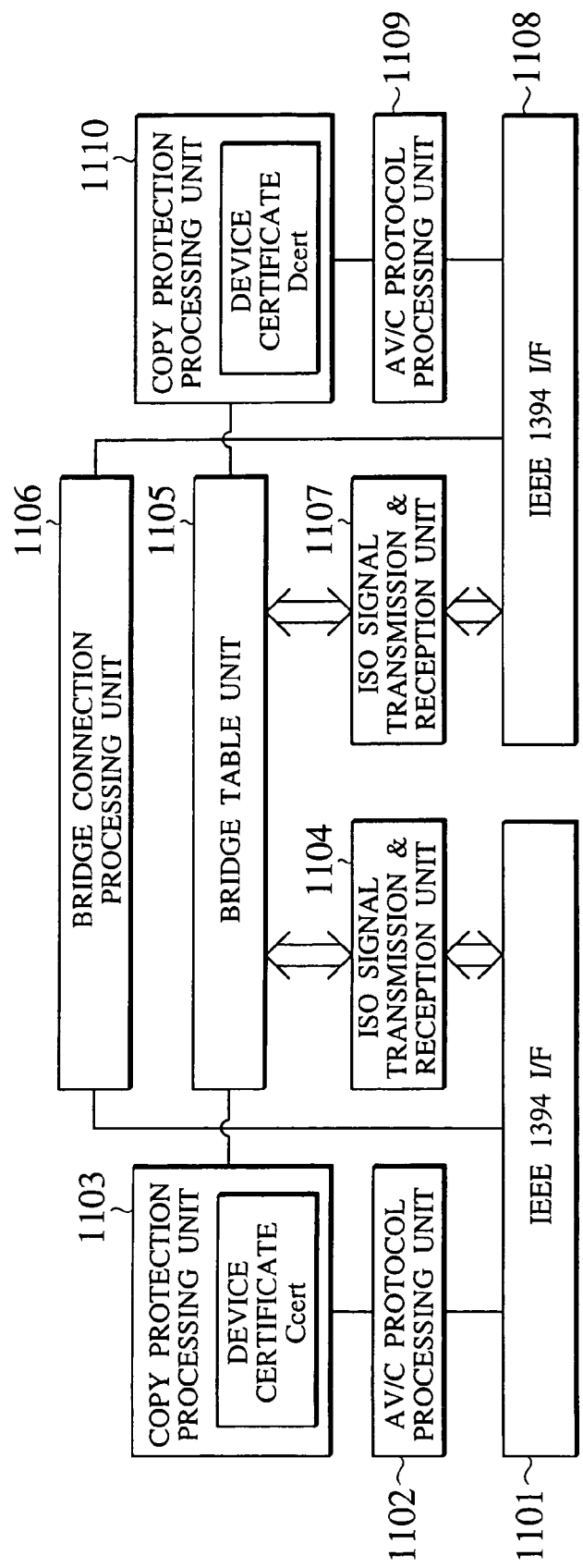
FIG. 8 is a block diagram showing an exemplary internal configuration of a relay device according to the second embodiment of the present invention.

FIG. 8 shows an exemplary internal configuration of the relay device (or network relay device) 102 in this second embodiment.

Similarly as the exemplary configuration of the first embodiment, this relay device 102 of FIG. 8 comprises a first IEEE 1394 interface (I/F) 1101, a second IEEE 1394 interface (I/F) 1108, a first AV/C protocol processing unit 1102, a second AV/C protocol processing unit 1109, a first copy protection processing unit 1103, a second copy protection processing unit 1110, a bridge table unit 1105, a first ISO signal transmission and reception unit 1104, a second ISO signal transmission and reception unit 1107, and a bridge connection processing unit 1106.

The difference from the first embodiment is that the copy protection processing units 1103 and 1110 have respective device certificates Ccert and Dcert (besides the processing algorithm is also apparently different).

FIG. 9 shows an exemplary overall operation sequence in this second embodiment, and FIGS. 10A to 10D show an exemplary configuration of the bridge table in this second embodiment.

The early part of the sequence of FIG. 9 is similar to that of the first embodiment in that the AV/C command is exchanged between the transmission device 101 and the reception device 103 (step S1201), the bridge connection command is exchanged between the transmission device 101 and the relay device 102 as well as between the relay device 102 and the reception device 103 (steps S1202, S1203), and the encrypted AV data are exchanged between the transmission device 101 and the relay device 102 as well as between the relay device 102 and the reception device 103 (steps S1204, S1205). Also, the registration into the bridge table is carried out at timings similar to those in the first embodiment, as shown in FIG. 10A and FIG. 10B. The other aspects of the procedure from the step S1201 to the step S1205 are also similar as the first embodiment so that their description will be omitted here.

Note that neither the authentication request nor the authentication and key exchange is carried out yet at this point. Also, the reception device 103 has not obtained the encryption key K yet.

Similarly as in the first embodiment, when the encrypted AV stream is received at the step S1205, the reception device 103 recognizes that the received data is encrypted so that there is a need for the authentication and key exchange with a sender of this encrypted data, and carries out a procedure for ascertaining a sender of this encrypted data.

To this end, the reception device 103 transmits an authentication query packet to the relay device 102 (step S1206). Note that, in practice, this authentication query packet may be a packet to be transmitted by an asynchronous stream, or an asynchronous packet destined to the relay device 102 because it is possible to ascertain that the relay device 102 is transmitting the encrypted AV data through the isochronous channel #y by looking at a value of the source node ID of the encrypted AV data.

This authentication query packet is a packet for checking which node is transmitting data with respect to the isochronous channel #y on the second IEEE 1394 bus 105. This packet contains a node ID (B, d) of the reception device 103 and a value of iPCR[0] which is a receiving plug, etc., besides the isochronous channel number #y, so as to indicate that the reception device 103 is receiving this encrypted AV data.

Upon receiving this authentication query packet, the relay device 102 registers that "iPCR[0] of (B, d) is receiving the isochronous channel #y" in a field for the authentication target in the bridge table. In addition, the relay device 102 checks that (A, a) on the first IEEE 1394 bus 104 is transmitting this isochronous channel by referring to the bridge table, and recognizes that the authentication query should be made with respect to (A, a).

At this point, instead of forwarding this authentication query from the relay device 102 as in the first embodiment, the authentication query is issued as if it is made by the relay device 102. Here, the authentication query is transmitted after changing the isochronous channel number to #x that corresponds to the isochronous channel on the first IEEE 1394 bus 104 by referring to the bridge table and also including a virtual iPCR as a receiving plug of the AV data so as to set this virtual iPCR of the relay device 102 as a source of the authentication query (step S1207). In addition, a value of this virtual iPCR is registered into the bridge table. Here it is assumed that the virtual PCR number is to be selected from a prescribed set of numbers for virtual PCRs, the real PCR number is to be selected from a prescribed set of numbers for real PCRs, and the virtual iPCR number to be used above is iPCR[100] as an example. FIG. 10C shows the registered content of the bridge table at this point.

Upon receiving this authentication query packet, the transmission device 101 returns an authentication reply indicating that what is transmitting to the isochronous channel #x is a plug oPCR[0] of a node ID (A, a) (step S1208). At this point, the destination of the authentication reply is set as the relay device 102 which is a sender of the authentication query at the step S1207.

Upon receiving this authentication reply, the relay device 102 registers the authentication target ((A, a), oPCR[0]) on the first IEEE 1394 bus side in the bridge table by referring to this packet, and returns the authentication reply as a reply to the earlier authentication query of the step S1206 from the reception device 103 by pretending as if the virtual oPCR (assumed to be oPCR[100]) of the own device is transmitting the AV data (step S1209). Also a value of this virtual PCR is registered into the bridge table. FIG. 10D shows the registered content of the bridge table at this point.

By the above procedure, the reception device 103 recognizes that the authentication target with which the authentication and key exchange should be carried out is the relay device 102 (a plug oPCR[100] of a node ID (B, a)). At this point, it becomes possible to carry out the authentication and key exchange between the reception device 103 and the relay device 102, as well as between the relay device 102 and the transmission device 101.

Next, the reception device 103 transmits the authentication request to the relay device 102 while the relay device 102 transmits the authentication request to the transmission device 101 (steps S1210, S1215). Similarly, the transmission device 101 transmits the authentication request to the relay device 102 while the relay device 102 transmits the authentication request to the reception device 103 (steps S1211, S1216). As such, the authentication and key exchange is carried out independently on the first IEEE 1394 bus 104 and on the second IEEE 1394 bus 105. This is because the reception device 103 is recognizing (oPCR[100] of) the relay device 102 as the authentication target (for its iPCR[0]), and the transmission device 101 is recognizing (iPCR[100] of) the relay device 102 as the authentication target (for its oPCR[0]).

Thereafter, the authentication and key exchange is respectively carried out between the transmission device 101 and the relay device 102 as well as between the relay device 102 and the reception device 103 (steps S1212, S1213, S1217, S1218N and S1219.

Also, at the steps S1214 and S1219, values of the exchange key Kx and the seed Nc forwarded from the transmission device 101 to the relay device 102 are forwarded from the relay device 102 to the reception device 103 as they are. In this way, it becomes possible to share the encryption key K between the transmission device 101 and the reception device 103 so that it becomes possible to decrypt the encrypted AV stream at the reception device 103. Thereafter, it is possible to carry out the cipher communications using the encryption key K between the transmission device 101 and the reception device 103 through the relay device 102.

Third Embodiment

Referring now to FIG. 11 to FIG. 15, the third embodiment of a network connection device, a network connection method and a communication device according to the present invention will be described in detail.

FIG. 1 shows an exemplary overall configuration of a network to which the present invention is to be applied.

Figure 11:
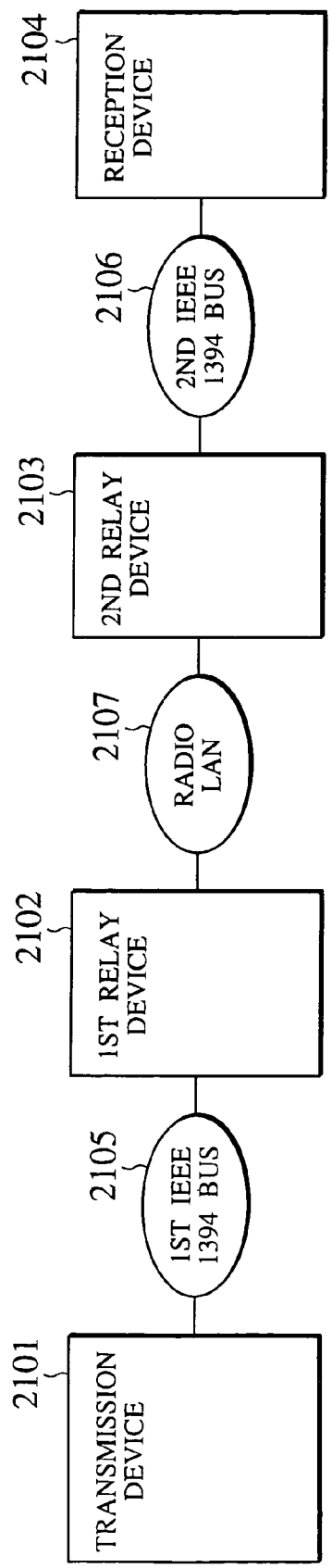
FIG. 11 is a schematic diagram showing an exemplary overall configuration of a network according to the third embodiments of the present invention.

This third embodiment will be described for an exemplary case where, in a network as shown in FIG. 11 in which a first IEEE 1394 buses 2105 and a radio LAN 2107 are connected by a first relay device 2102 and the radio LAN 2107 and a second IEEE 1394 bus 2106 are connected by a second relay device 2103, an AV data are to be transferred from a transmission device 2101 connected to the first IEEE 1394 bus 2105 to a reception device 2104 connected to the second IEEE 1394 bus 2106. In this exemplary case, the AV data (which are assumed to be MPEG video data as an example) to be transferred are assumed to be encrypted for the purpose of copyright protection, as in the previous embodiments.

In the following, the differences from the previous embodiments will be mainly described.

In this third embodiment, the exemplary internal configuration of the transmission device 2101 is basically the same as that of FIG. 2 of the first embodiment, and the exemplary internal configuration of the reception device 2104 is basically the same as that of FIG. 3 of the first embodiment.

Figure 12:
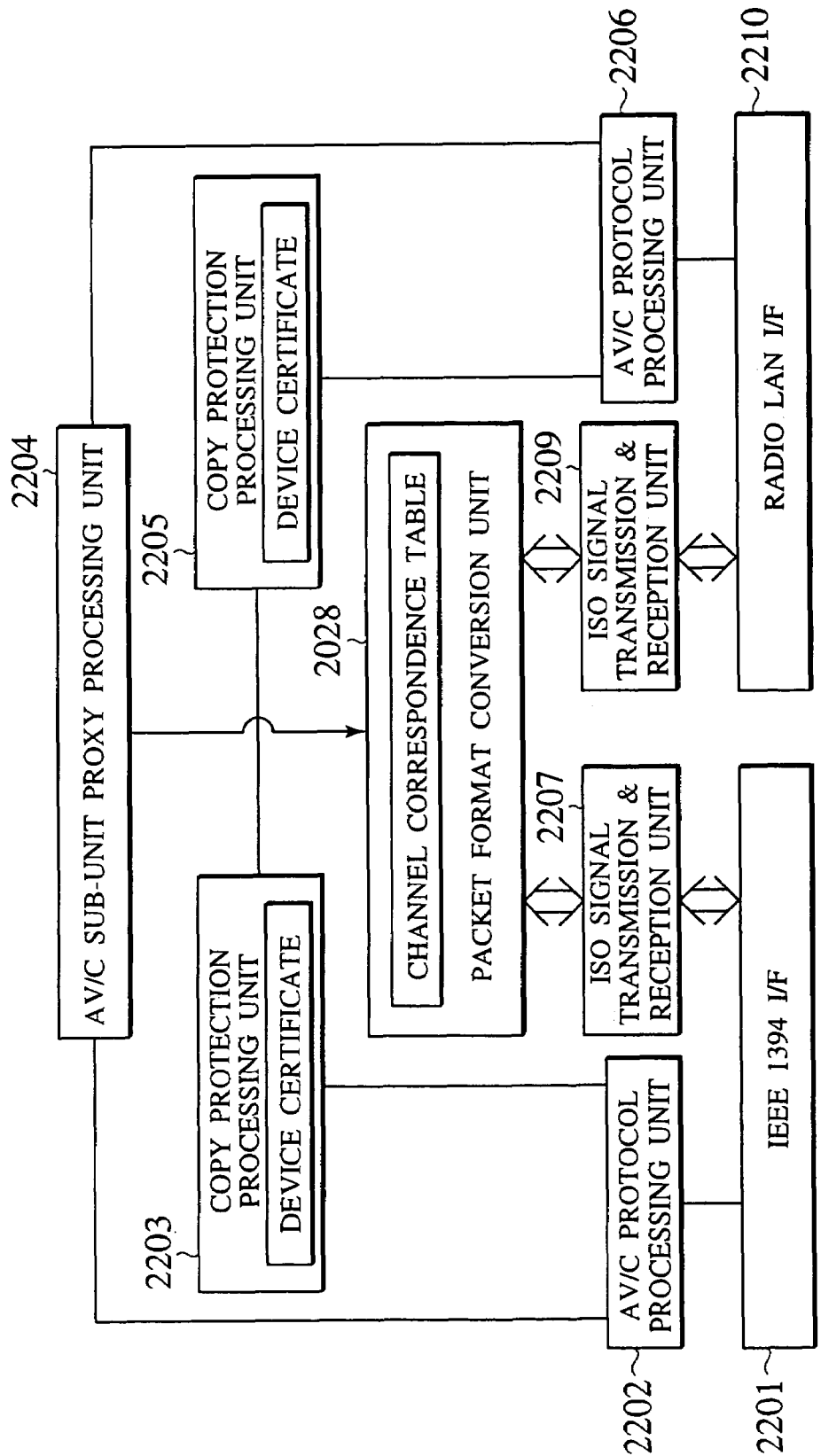
FIG. 12 is a block diagram showing an exemplary internal configuration of a first relay device or a second relay device according to the third embodiment of the present invention.

FIG. 12 shows an exemplary internal configuration of the relay device (or network relay device) 2105 (2107) in this third embodiment.

This relay device 2105 (2107) of FIG. 12 comprises an IEEE 1394 interface (I/F) 2201, a radio LAN interface (I/F) 2210, a first AV/C protocol processing unit 2202, a second AV/C protocol processing unit 2206, a first copy protection processing unit 2203, a second copy protection processing unit 2205, a first ISO signal transmission and reception unit 2207, a second ISO signal transmission and reception unit 2209, an AV/C sub-unit proxy processing unit 2204, and a packet format conversion unit 2208.

The copy protection processing units 2203 and 2205 have respective device certificates Ccert and Dcert.

The packet format conversion unit 2208 has a channel correspondence table. FIG. 13 shows an example of the channel correspondence table in the first relay device 2102, and FIG. 14 shows an example of the channel correspondence table in the second relay device 2103.

Here, the second relay device 2103 will be mainly described, but the basic operation is the same for the first relay device 2102 and the second relay device 2103. They have the same configuration, but one is connected to the transmission device 2101 while the other is connected to the reception device 2104 so that there are differences in their operations in that the logical functions of the IEEE 1394 bus side and the radio LAN side are interchanged depending on whether an input side or an output side of packets is the IEEE 1394 bus side or the radio LAN side from a viewpoint of the packet transfer from the transmission device 2101 to the reception device 2104, and that whether a reception channel check with respect to the reception device 2104 is to be carried out or not. Note that, in the following, the differences of the relay devices 2102 and 2103 from the relay device 102 in the second embodiment will be mainly described.

FIG. 15 shows an exemplary overall operation sequence in this third embodiment.

Note here that the sequence up to the encrypted AV data transfer that takes place before the key exchange is basically the same as or similar to those of the first and second embodiments in that the control command is transferred from the transmission device 2101 to the reception device 2104 and the route is set up from the transmission device 2101 through the relay devices 2102 and 2103 to the reception device 2104, so that these procedures are not shown in FIG. 15 and their description will be omitted.

Here, the relay device 2102 or 2103 of this third embodiment may have a function for automatically carrying out a configuration recognition for recognizing services or sub-units on one network and presenting these services or sub-units as if they are services or sub-units of the own device (the relay device itself) to the other network. This this embodiment assumes that such a function is provided in the relay devices 2102 and 2103. This function is realized by the AV/C sub-unit proxy processing unit 2210.

In an example of FIG. 11, the first relay device 2102 provides a proxy service for the transmission device 2101 with respect to the radio LAN 2107 side. As a result, (services or sub-units of) the transmission device 2101 will be recognized as constituent elements inside the first relay device 2102 from the radio LAN 2107 side.

Also, the second relay device 2103 provides a proxy service for "a proxy service for the transmission device 2101 that is provided by the first relay device 2102" which is a constituent element inside the first relay device 2102, with respect to the second IEEE 1394 bus 2106 side. In other words, the second relay device 2103 effectively provides a proxy service for the transmission device 2101 with respect to the second IEEE 1394 bus 2106 side. As a result, (services or sub-units of) the transmission device 2101 will be recognized as constituent elements inside the second relay device 2103 from the second IEEE 1394 bus 2106 side.

Also, at the relay device 2102 or 2103, a control command from a proxy service target network side is received at the AV/C protocol processing unit on the proxy service target network side, and a service/sub-unit to which this command is actually destined is recognized at the AV/C sub-unit proxy processing unit 2204 by referring to a table or the like. Then, this command is converted into a command for the service/sub-unit for which the proxy service is provided and transmitted to a proxy service source network side through the AV/C protocol processing unit on the proxy service source network side.

Now, the reception device 2104 recognizes the transmission device 2101 as if it is a constituent element of the second relay device 2103 as described above, and transmits a control command for that constituent element which is actually the transmission device 2101, to the second relay device 2103.

The second relay device 2103 receives this control command from the IEEE 1394 bus side. Here, it is recognized that this control command is destined to one constituent element (that is the proxy service for the transmission device 2101) of the first relay device 2102 on the radio LAN side for which the second relay device 2103 is playing a role of a proxy. Consequently, this control packet is converted from that destined to the own device to that destined to the first relay device 2102 and transmitted to the radio LAN side.

The first relay device 2102 receives this control command from the radio LAN side. Here, it is recognized that this control command is destined to the transmission device 2101 on the IEEE 1394 bus side for which the first relay device is playing a role of a proxy. Consequently, this control packet is converted from that destined to the own device to that destined to the transmission device 2101 and transmitted to the IEEE 1394 bus side.

Either before or after this control command, a set up of a communication path from the transmission device 2101 to the reception device 2104 for guaranteeing QOS (Quality Of Service) is carried out. Here, the detail of this communication path set up will be omitted, and it is assumed that an isochronous channel #x is reserved on the first IEEE 1394 bus 2105, a channel #y with a reserved communication bandwidth is reserved on the radio LAN 2107, and an isochronous channel #z is reserved on the second IEEE 1394 bus 2106 as a result of this communication path set up.

Now, after the isochronous channel #x connecting the transmission device 2101 and the first relay device 2102, the channel #y connecting the first relay device 2102 and the second relay device 2103, and the isochronous channel #z connecting the second relay device 2103 and the reception device 2104 are established, the encrypted AV stream is transmitted from the transmission device 2101 and transferred to the reception device 2104 through the first relay device 2102 and the second relay device 2103 (step S2301 to S2303).

Namely, the (encrypted) AV data transmitted from the transmission device 2101 toward the reception device 2104 reaches to the first relay device 2102 through the isochronous channel #x on the first IEEE 1394 bus 2105. Here, this AV data is transmitted to the channel #y on the radio LAN 2107 via the ISO signal transmission and reception unit 2207, the packet format conversion unit 2208, and the ISO signal transmission and reception unit 2209. Thereafter, similarly, this AV data reaches to the reception device 2104 through the isochronous channel #z on the second IEEE 1394 bus 2106 via the second relay device 2103. Here, at each relay device, the encrypted AV data is transferred in its encrypted form without being applied with the decryption processing (although a timestamp value, a link layer header, etc. may be rewritten).

In this third embodiment, each relay device is provided with the channel correspondence table for registering relationships among these channels, and at this point, the channel correspondence table in the second relay device 2103 registers information on respective isochronous channel numbers, transmission/reception directions, and senders of the AV data (i.e., upper three lines of FIG. 14). Namely, the authentication target is not yet determined, and the second relay device 2103 still has not recognized a node to which a flow transmitted to the second IEEE 1394 bus 2106 side is destined. The channel correspondence table of the first relay device 2102 shown in FIG. 13 is also similar.

Now, upon receiving the encrypted AV data, the reception device 2104 transmits the authentication request to a transmitting node of that AV data, as specified in advance, in order to acquire information regarding the encryption key that is necessary in decrypting this encrypted AV data (step S2304). In the case of this example, the reception device 2104 refers to the source node address (a field provided in a CIP header) of the AV data received through the isochronous channel #z and recognizes that it is transmitted from the second relay device 2103, so that the reception device 2104 transmits the authentication request to the second relay device 2103.

Here, unlike the first embodiment (where it is assumed that the authentication and key exchange on the IEEE 1394 is carried out for each AV data flow or for each AV/C plug, and that a plurality of different encryption keys can be used for different flows or for different plugs between the same nodes), it is assumed that only one encryption key can be defined between the same nodes (the second relay device 2103 and the reception device 2104 in this example) on the second IEEE 1394 bus 2106. Here, even when a plurality of flows are exchanged simultaneously at different plugs, the same encryption key is used for the flows having the same encryption management information (copy control information), such as those for "Never Copy" contents. This encryption management information (copy control information) is an information for describing a manner of handling a copy of the transferred data, such as "this data can be copied so and so times", "this data cannot be copied", etc. It is also assumed that the same is also true for the first IEEE 1394 bus 2105 side (between the transmission device 2101 and the first relay device 2102).

On the other hand, it is assumed that the radio LAN 2107 can use different encryption keys for different flows or different plugs between the same nodes, similarly as in the first embodiment.

The reason for connecting a plurality of networks that can only use an identical encryption key for flows exchanged between the same nodes by a network that can use different encryption keys for different flows exchanged between the same nodes in this manner is the following.

Namely, suppose that two or mode transmission devices (a first transmission device and a second transmission device, for example) exist on the first IEEE 1394 bus 2105 and two or more reception devices (a first reception device and a second reception device, for example) exist on the second IEEE 1394 bus 2106, where the encrypted AV data are exchanged between the first transmission device and the first reception device as well as between the second transmission device and the second reception device. In this case, if the radio LAN that is located between the two IEEE 1394 buses cannot use different encryption keys for different flows, it would only be possible to use the same encryption key for above described two flows. However, in practice, which encryption key should be used is a matter to be determined independently by the individual transmission devices (the first transmission device and the second transmission device, for example), so that there is no guarantee for two encryption keys determined by two transmission devices to be identical in the case of this example.

Thus if the key cannot be defined for each flow in the radio LAN, it would be impossible to transfer the above described two encrypted flows on the radio LAN. On the contrary, if the key can be defined for each flow in the radio LAN 2107, even when the first and second IEEE 1394 buses 2105 and 2106 support only a single key between the same nodes, it becomes possible to simultaneously exchange a plurality of flows outputted from a plurality of transmission devices under the interconnected environment using the radio LAN 2107.

Now, in order to realize this, there is a need to provide some special measure in the second relay device 2103. Namely, even when the authentication request from the reception device 2104 is received, this authentication request itself does not indicate a flow to which this authentication request is related, so that a key for which flow will be transmitted in the final key exchange cannot be judged. For this reason, upon receiving the authentication request from the reception device 2104 at the step S2304, the second relay device 2103 transmits a reception channel check packet to the reception device 2104 (step S2305), in order to check a channel (a plug) that provides the encrypted AV flow to which this authentication request is related. This packet is a packet for inquiring "by which channel/plug are you receiving (the encrypted AV data)?" to the reception device 2104. In response to this, the reception device 2104 replies the reception channel (which is #z in this embodiment) (step S2306).

It is also possible to replace this reception channel check packet procedure (steps S2305, S2306) by an operation of the second relay device 2103 to check a channel by which the reception device 2104 is receiving data, by reading a register regarding a plug of the reception device 2104.

Upon obtaining the isochronous channel number (#z in this example) through which the reception device 2104 is receiving data, the second relay device 2103 refers to its channel correspondence table registering relationships among channels, and recognizes that it is the channel #y on the radio LAN side that is transmitting through the isochronous channel #z to the second IEEE 1394 side, and it is the first relay device that is transmitting through the channel #y on the radio LAN side. In other words, it is ascertained that the flow that is received from (oPCR[0] of) the first relay device 2102 is being forwarded to the isochronous channel #z in the second IEEE 1394 bus 2106. This fact is registered into the channel correspondence table of FIG. 14 (in fields for an authentication target and a receiver on the second IEEE 1394 side).

Now, either before or after that, the authentication and key exchange procedure similar to that described in the first embodiment (but a flow or a plug is also specified in the authentication procedure) is carried out between the first relay device 2102 and the second relay device 2103 (steps S2310 to S2315). In the channel correspondence table of FIG. 14, a field for a receiver on the radio LAN side is registered at the step S2310, and a field for an authentication target on the radio LAN side is registered at the step S2311. Also, in the channel correspondence table of FIG. 13, fields for an authentication target and a receiver on the radio LAN side are registered at the step S2310, and a plug number of this device itself on the radio LAN side is registered at the step S2311.

Also, either before or after that, the authentication and key exchange is carried out between the transmission device 2101 and the first relay device 2102 (steps S2316 to S2319) in a form similar to that between nodes, i.e., between the second relay device 2103 and the reception device 2104 (except that there is no need for the reception channel check). In the channel correspondence table of FIG. 13, fields for an authentication target and a receiver on the IEEE 1394 side are registered at the step S2316.

Note that the remaining authentication request and the authentication and key exchange procedure are also carried out between the second relay device 2103 and the reception device 2104 (steps S2307 to S2309).

The first relay device 2102 can recognize that it suffices to relate the authentication and key exchange procedure carried out between the second relay device 2103 and the first relay device 2102 with the authentication and key exchange carried out between the transmission device 2101 and the first relay device 2102 (by referring to the channel correspondence table of FIG. 13 registering relationships among channels at the first relay device 2102, because the output plug OPCR[0] of the first relay device 2102 is specified). For this reason, the first relay device 2102 forwards values of the exchange key Kx and the seed Nc that are notified to the first relay device 2102 as a result of the authentication and key exchange carried out between the transmission device 2101 and the first relay device 2102, to the second relay device 2103 (by specifying that the output plug is oPCR[0] of the first relay device 2102 and the input plug is iPCR[0] of the second relay device 2103) (steps S2320, S2321).

Similarly, the second node device 2103 can recognize that values of the exchange key Kx and the seed Nc notified to the second relay device 2103 as a result of the authentication and key exchange carried out between the first relay device 2102 and the second relay device 2103 are related to the isochronous channel #z on the second IEEE 1394 bus 2106 side, and they are destined to the reception device 2104, by referring to the channel correspondence table of FIG. 14 registering relationships among channels at the second relay device 2103, so that the second device 2103 forwards them to the reception device 2104 (by specifying that the output plug is oPCR[0] of the second relay device 2103 and the input plug is iPCR[0] of the reception device 2104) (steps S2321, S2322).

Note that, in the case where a plurality of receivers exist for the same isochronous channel (#z, for example) on the second IEEE 1394 bus 2106, the channel correspondence table of FIG. 14 will be provided as many as the number of these receivers. In this way, it becomes possible to notify values of the keys or the like accurately to each reception device.

The same also applies to the channel correspondence table of FIG. 13 in the case where a plurality of senders exist for the same isochronous channel (#x, for example) on the first IEEE 1394 bus 2105.

In this way, the reception device 2104 that received the values of the exchange key Kx and the seed Nc becomes possible to calculate the value of the encryption key and decrypt the encrypted AV data, similarly as in the first embodiment.

In this third embodiment, the first and second relay devices 2102 and 2103 can forward the encrypted AV data to a next hop channel without decrypting them, so that there is no need to decrypt and re-encrypt data every time data pass through the relay device, and therefore it becomes possible to realize a considerable reduction of the processing cost.

As described, according to the present invention, it becomes possible to carry out the contents protection procedure between devices that are not connected to the same network, for the purpose of transmission and reception of contents that require protection.

In particular, according to the present invention, the network connection device notifies information regarding a transmission node on the first IEEE 1394 bus to the reception node on the second IEEE 1394 bus, so that the reception node can carry out the authentication and key exchange procedure directly with the transmission node on a different network, and therefore it becomes possible to realize the contents protection procedure between the transmission node and the reception node that are not connected to the same network.

In addition, according to the present invention, in the authentication query procedure, the network connection device notifies the own device as the reception node or the transmission node with respect to the transmission node on the first IEEE 1394 bus or the reception node on the second IEEE 1394 bus respectively, and the network connection device carries out the authentication and key exchange procedure with the transmission node on the first IEEE 1394 bus as well as with the reception node on the second IEEE 1394 bus, and forwards information regarding keys from the transmission node to the reception node, so that it becomes possible to realize the contents protection procedure between the transmission node and the reception node that are not connected to the same network.

Moreover, according to the present invention, when the authentication request from the reception node on the second network is received, the network connection device checks the isochronous channel by which the reception node is receiving data, and when information regarding the encryption key for that data is notified from a node that is transmitting that data to be transferred to that isochronous channel on the first network, the network connection device notifies this information to the reception node on the second network, so that it becomes possible to realize the contents protection procedure between the transmission node and the reception node that are not connected to the same network.

Furthermore, according to the present invention, the network connection device can forward the encrypted data without decrypting them, so that there is no need to decrypt and re-encrypt data every time data pass through the network connection device, and therefore it becomes possible to realize a considerable reduction of the processing cost.

It is to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, any of the transmission device, the relay device, and the reception device of each of the above described embodiments can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention.

Accordingly, all such modifications and variations are intended to be included within the scope of the appended claims.

What is claimed is:

1. A network connection device for connecting a first IEEE 1394 bus and a second IEEE 1394 bus, comprising:

a data reception unit connected to the first IEEE 1394 bus and configured to receive data transferred from a transmission node connected to the first IEEE 1394 bus through a first isochronous channel on the first IEEE 1394 bus;

a data transfer unit connected to the second IEEE 1394 bus and configured to transfer the data to a reception node connected to the second IEEE 1394 bus through a second isochronous channel on the second IEEE 1394 bus;

a query reception unit configured to receive a query on information regarding the transmission node from the reception node, by using a prescribed packet on the second IEEE 1394 bus;

an inquiry unit configured to make an inquiry on the information regarding the transmission node to the transmission node, by using a prescribed packet on the first IEEE 1394 bus, upon receiving the query;

a reply reception unit configured to receive a reply to the inquiry from the transmission node, by using a prescribed packet on the first IEEE 1394 bus; and a reply notification unit configured to notify the reply to the reception node, by using a prescribed packet on the second IEEE 1394 bus, upon receiving the reply, so as to facilitate a contents protection procedure between the transmission node and the reception node that are not connected to an identical network by using the query and the reply.

2. The network connection device of claim 1, wherein the prescribed packet used by the query reception unit, the inquiry unit, the reply reception unit, and the reply notification unit is any one of an asynchronous stream, and an asynchronous packet.

3. The network connection device of claim 1, wherein the prescribed packet received by the reply reception unit contains information for identifying the transmission node and information for identifying a plug or sub-unit of the transmission node that is to be used for transferring the data, as the information regarding the transmission node.

4. The network connection device of claim 1, wherein the reply notification unit notifies the reply that contains the information regarding the transmission node so as to enable the reception node on the second IEEE 1394 bus to carry out an authentication and key exchange procedure directly with the transmission node on the first IEEE 1394 bus according to the information regarding the transmission node that is contained in the reply.

5. The network connection device of claim 1, wherein the inquiry unit makes the inquiry by pretending that a virtual plug or sub-unit of the network connection device is receiving the data on the first isochronous channel; and the reply notification unit notifies the reply by pretending that a virtual plug or sub-unit of the network connection device is transmitting the data on the second isochronous channel.

6. The network connection device of claim 5, wherein the prescribed packet used by the query reception unit, the inquiry unit, the reply reception unit, and the reply notification unit is any one of an asynchronous stream, and an asynchronous packet.

7. The network connection device of claim 5, wherein the prescribed packet used for the query received by the query reception unit contains information for identifying the reception node and information for identifying a plug or sub-unit of the reception node that is to be used for transferring the data, as information regarding the reception node;

the prescribed packet used for the reply received by the reply reception unit contains information for identifying the transmission node and information for identifying a plug or sub-unit of the transmission node that is to be used for transferring the data, as the information regarding the transmission node; and the network connection device further comprises:

a first authentication and key exchange processing unit configured to carry out an authentication and key exchange procedure between the plug or sub-unit of the transmission node which replied to the inquiry on the first IEEE 1394 bus and the virtual plug or sub-unit of the network connection device; and a second authentication and key exchange processing unit configured to carry out an authentication and key exchange procedure between the virtual plug or sub-unit of the network connection device and the plug or sub-unit of the reception node on the second IEEE 1394 bus.

8. The network connection device of claim 7, further comprising:

an encryption key information reception unit configured to receive information regarding an encryption key related to the virtual plug or sub-unit, from the transmission node on the first IEEE 1394 bus, after the authentication and key exchange procedure by the first authentication and key exchange processing unit is completed; and an encryption key information transfer unit configured to transfer the information regarding the encryption key to the reception node on the second IEEE 1394 bus, after at least a part of the authentication and key exchange procedure by the second authentication and key exchange processing unit is completed.

9. The network connection device of claim 1, further comprising:

a memory unit configured to store a correspondence among an information for identifying the first isochronous channel, an information for identifying the transmission node, and an information for identifying the second isochronous channel;

wherein the inquiry unit makes the inquiry to the transmission node as determined by referring to the correspondence stored in the memory unit, according to the information for identifying the second isochronous channel that is contained in the query received by the query reception unit.

10. A network connection device for connecting a first network and a second network, the first network supporting a use of one or more encryption keys for transmission and/or reception of encrypted data between nodes connected to a same network, and the second network supporting a use of an identical encryption key and a use of transmission and/or reception through a prescribed channel for transmission and/or reception of encrypted data between nodes connected to a same network, the network connection device comprising:

a data reception unit connected to a bus of the first network configured to receive data transferred from a node connected on the first network;

a data transfer unit connected to a bus of the second network configured to transfer the data received by the data reception unit to a node connected on the second network through the prescribed channel on the second network;

an authentication request reception unit configured to receive an authentication request from one node connected on the second network;

an encryption key information reception unit configured to receive an encryption key information regarding an encryption key for a specific data to be transferred to a specific channel on the second network from another node connected on the first network which is transmitting the specific data to the network connection device; and an encryption key information transfer unit configured to transfer the encryption key information to said one node, so as to facilitate a contents protection procedure between the transmission node and the reception node that are not connected to an identical network by using the authentication request and the encryption key information.

11. The network connection device of claim 10, further comprising:

an inquiry unit configured to make an inquiry on information for identifying a specific channel by which said one node is receiving data, to said one node upon receiving the authentication request;

a reply reception unit configured to receive a reply to the inquiry from said one node;

wherein the encryption key information reception unit receives the encryption key information regarding an encryption key for the specific data to be transferred to the specific channel on the second network as specified by information contained in the reply received by the reply reception unit.

12. The network connection device of claim 10, further comprising:
  a first authentication and key exchange processing unit configured to carry out an authentication and key exchange procedure with said another node; and
  a second authentication and key exchange processing unit configured to carry out an authentication and key exchange procedure with said one node.

13. A communication device, connected to a first IEEE 1394 bus, for receiving data through a network connection device connected to the first IEEE 1394 bus from a transmission node on a second IEEE 1394 bus, the communication device comprising:
  a data reception unit configured to receive data transferred from the network connection device, through a first isochronous channel on the first IEEE 1394 bus;
  a query unit configured to make a query on information regarding the transmission node to the network connection device by using a prescribed packet on the first IEEE 1394 bus, when the data received by the data reception unit are encrypted;
  a reply reception unit configured to receive a reply to the query from the network connection device by using a prescribed packet on the first IEEE 1394 bus, the reply being obtained by the network connection device by making an inquiry on the information regarding the transmission node on the second IEEE 1394 bus upon receiving the query; and
  an authentication and key exchange processing unit configured to carry out an authentication and key exchange procedure directly with the transmission node on the second IEEE 1394 bus, according to the reply received by the reply reception unit, so as to facilitate a contents protection procedure with the transmission node that is not connected to an identical network by using the query and the reply.

14. The communication device of claim 13, wherein the reply reception unit receives the reply that contains the information regarding the transmission node, and the authentication and key exchange processing unit carries out the authentication and key exchange procedure according to the information regarding the transmission node that is contained in the reply.

15. A network connection method for connecting a first IEEE 1394 bus and a second IEEE 1394 bus, comprising the steps of:
  (a) transmitting data through a first isochronous channel from a transmission node on the first IEEE 1394 bus;
  (b) receiving the data transmitted from the transmission node through the first isochronous channel on the first IEEE 1394 bus at a network connection device, and transferring the data from the network connection device to a reception node on the second IEEE 1394 bus through a second isochronous channel on the second IEEE 1394 bus;
  (c) receiving the data transferred from the network connection device through the second isochronous channel on the second IEEE 1394 bus at the reception node, and when the data are encrypted, making a query on information regarding the transmission node from the reception node to the network connection device by using a prescribed packet on the second IEEE 1394 bus;
  (d) making an inquiry on the information regarding the transmission node from the network connection device to the transmission node by using a prescribed packet on the first IEEE 1394 bus, upon receiving the query from the reception node;
  (e) transmitting a reply to the inquiry from the transmission node to the network connection device by using a prescribed packet on the first IEEE 1394 bus, upon receiving the inquiry from the network connection device; and
  (f) notifying the reply from the network connection device to the reception node by using a prescribed packet on the second IEEE 1394 bus, upon receiving the reply from the transmission node, so as to facilitate a contents protection procedure between the transmission node and the reception node that are not connected to an identical network by using the query and the reply.

16. The network connection method of claim 15, further comprising the step of:
  (g) carrying out an authentication and key exchange procedure directly with the transmission node, at the reception node according to information contained in the reply.

17. The network connection method of claim 15, wherein:
  at the step (c), the reception node makes the query that contains information for identifying the reception node and information for identifying a plug or sub-unit of the reception node that is to be used for transferring the data;
  at the step (d), the network connection device makes the inquiry by pretending that a virtual plug or sub-unit of the network connection device is receiving the data on the first isochronous channel;
  at the step (e), the transmission node transmits the reply that contains information for identifying the transmission node and information for identifying a plug or sub-unit of the transmission node that is to be used for transferring the data; and
  at the step (f), the network connection device notifies the reply by pretending that a virtual plug or sub-unit of the network connection device is transmitting the data on the second isochronous channel.

18. The network connection method of claim 17, further comprising the steps of:
  (g) carrying out an authentication and key exchange procedure between the plug or sub-unit of the transmission node and the virtual plug or sub-unit of the network connection device; and
  (h) carrying out an authentication and key exchange procedure between the virtual plug or sub-unit of the network connection device and the plug or sub-unit of the reception node.

* * * * *